US008783192B2

(12) United States Patent
Smith

(10) Patent No.: US 8,783,192 B2
(45) Date of Patent: Jul. 22, 2014

(54) GLOBAL RAPID TRANSIT INFRASTRUCTURE USING LINEAR INDUCTION DRIVE

(76) Inventor: Ronald H. Smith, Rockville, MD (US)

( * ) Notice: Subject to any disclaimer, the term of this patent is extended or adjusted under 35 U.S.C. 154(b) by 1 day.

(21) Appl. No.: 13/488,564

(22) Filed: Jun. 5, 2012

(65) Prior Publication Data
US 2013/0139717 A1    Jun. 6, 2013

Related U.S. Application Data

(60) Provisional application No. 61/567,575, filed on Dec. 6, 2011.

(51) Int. Cl.
*B60L 13/04* (2006.01)

(52) U.S. Cl.
USPC .......................................... 104/282; 104/281

(58) Field of Classification Search
USPC ........... 104/281–284, 288, 88.02–88.04, 118, 104/119, 120, 124, 243; 105/215.1, 215.2
See application file for complete search history.

(56) References Cited

U.S. PATENT DOCUMENTS

| 782,312 | A | | 2/1905 | Zehden | |
|---|---|---|---|---|---|
| 2,760,617 | A | * | 8/1956 | Bowen | 193/35 TE |
| 3,945,326 | A | * | 3/1976 | Seifert | 105/72.2 |
| 4,393,969 | A | * | 7/1983 | Woell | 193/35 TE |
| RE32,543 | E | * | 11/1987 | Williamson | 318/376 |
| 4,718,875 | A | * | 1/1988 | McKittrick et al. | 446/231 |
| 4,900,992 | A | * | 2/1990 | Sekizawa et al. | 318/135 |
| 5,478,030 | A | * | 12/1995 | Derrien et al. | 244/102 R |
| 5,503,083 | A | * | 4/1996 | Powell et al. | 104/281 |
| 5,813,349 | A | * | 9/1998 | Jensen | 104/28 |
| 5,941,542 | A | * | 8/1999 | Kalman | 280/38 |
| 6,012,396 | A | * | 1/2000 | Schulz | 105/72.2 |
| 6,029,104 | A | * | 2/2000 | Kim | 701/20 |
| 6,095,054 | A | * | 8/2000 | Kawano et al. | 104/139 |
| 6,182,576 | B1 | * | 2/2001 | Svensson | 104/120 |
| 6,215,260 | B1 | * | 4/2001 | Hinds | 318/135 |
| 6,263,799 | B1 | * | 7/2001 | Pardes | 104/28 |
| 6,324,994 | B1 | * | 12/2001 | Glenn | 105/72.2 |
| 6,619,212 | B1 | * | 9/2003 | Stephan et al. | 104/292 |
| 6,857,374 | B2 | * | 2/2005 | Novacek | 104/130.07 |
| 7,118,115 | B2 | * | 10/2006 | Abel | 280/43.13 |
| 7,975,620 | B2 | * | 7/2011 | Pumpelly | 105/215.2 |
| 8,127,919 | B2 | * | 3/2012 | Harris et al. | 198/861.1 |

(Continued)

FOREIGN PATENT DOCUMENTS

| JP | 05162516 | A | * | 6/1993 | ............... B60F 1/04 |
|---|---|---|---|---|---|
| JP | 2006088802 | A | * | 4/2006 | |

OTHER PUBLICATIONS

Boon-Teck,Ooi, "Traction and Normal Forces in the Linear Induction Motor" IEEE Transactions on Power Apparatus and Systems, Jan. 2007.

(Continued)

*Primary Examiner* — Jason C Smith

(57) ABSTRACT

Transportation infrastructure comprises linear induction drives wherein a roadway surface is induced to simultaneously exert forward, lateral, levitation and three axis angular alignment forces on a vehicle and wherein a vehicle is capable of inducing roadway surface currents that produce said forces in said roadway surface. Comprehensive system sustains continuous traffic flow from the point of entering the infrastructure to the moment of disembarking in a parking facility. Transportation infrastructure comprises integration of air and space travel with substantially reduced cost and transit time.

10 Claims, 7 Drawing Sheets

(56) References Cited

U.S. PATENT DOCUMENTS

| | | | |
|---|---|---|---|
| 2003/0173173 A1* | 9/2003 | Stephan et al. | 191/10 |
| 2003/0173174 A1* | 9/2003 | Stephan et al. | 191/10 |
| 2004/0118315 A1* | 6/2004 | Reichel et al. | 104/118 |
| 2004/0245733 A1* | 12/2004 | Abel | 280/39 |
| 2006/0201376 A1* | 9/2006 | Brigham | 104/130.07 |
| 2007/0289477 A1* | 12/2007 | Sobolewski | 105/215.2 |
| 2009/0249973 A1* | 10/2009 | Wamble et al. | 104/282 |
| 2010/0011986 A1* | 1/2010 | Pumpelly | 105/215.2 |
| 2010/0043665 A1* | 2/2010 | Brigham | 104/88.01 |
| 2010/0201186 A1* | 8/2010 | Rosenboom | 305/134 |
| 2011/0226151 A1* | 9/2011 | Pumpelly | 104/118 |
| 2013/0139717 A1* | 6/2013 | Smith | 104/282 |

OTHER PUBLICATIONS

Johnson, Andrew, "High speed linear induction motor efficiency optimization" MIT Masters Thesis, Department of Ocean Engineering, 2005, Cambridge, MA.

* cited by examiner

GLOBAL RAPID TRANSIT INFRASTRUCTURE USING LINEAR INDUCTION DRIVE

CROSS REFERENCE TO RELATED APPLICATIONS

This application claims the benefit of provisional patent application Ser. No. 61/567,575 filed 2011 Dec. 6 by the present inventor.

1 BACKGROUND—PRIOR ART

1.1 U.S. Patents

| Patent Number | Kind Code | Issue Date | Patentee |
|---|---|---|---|
| 782,312 | B1 | 1905 Feb. 14 | Zehden |
| 6,215,260 | B1 | 2001 Apr. 10 | Hinds |
| 5,503,083 | B1 | 1969 Oct. 07 | Powell |
| 6,182,576 | B1 | 2001 Feb. 06 | Svensson |
| 4,900,992 | B1 | 1990 Feb. 13 | Sekizawa |
| RE32543 | E | 1987 Nov. 10 | Williamson |

1.2 U.S. Patent Application Publications

| Publication Nr. | Kind Code | Publ. Date | Applicant |
|---|---|---|---|
| 20090249973 | A1 | 2009 Jun. 15 | Wamble |

1.3 Nonpatent Literature Documents

Boon-Teck, Ooi, *IEEE Transactions on Power Apparatus and Systems*, "Traction and Normal Forces in the Linear Induction Motor" (January 2007)

Johnson, Andrew P., Massachusetts Institute of Technology Ph.D. thesis, Departments of Ocean Engineering, Electrical Engineering and Computer Science, "High speed linear induction motor efficiency optimization" (2005)

1.4 Background Narrative

Zehden, Wamble, Powell and Svensson describe linear induction drives that cooperate with vehicles to produce forward drive. In all of these instances vehicles are constrained to a particular single axis alignment with induction elements.

Hinds describes drives capable of impelling vehicles in forward and lateral directions. Wamble and Powell describe vehicles that may operate on battery power or power transmitted from a roadway. Boon-Teck describes means of acting on vehicles with levitation and forward forces.

Several additional capabilities associated with linear induction drives for vehicles are described in the prior art, including; 1) efficient regenerative braking with electric motor driven, wheels as described for example by Sekizawa, 2) efficient regenerative braking on linear roadway as described for example by Williamson, 3) charging vehicle battery while vehicle is moving on roadway as described for example by Carkner, 4) exchange of guidance and control information between vehicle and central integrated control systems as described for example by Ozden and 5) transfer of moving vehicle to and from roadway as described for example by Campbell. However, nowhere in the prior art does any inventor or author describe a plurality of said additional capabilities operating in combination with a linear induction drive transportation system in which a single roadway configuration is induced to simultaneously exert forward, lateral, levitation and three axis angular alignment forces on a vehicle. Neither does the prior art describe a vehicle capable of inducing roadway surface currents that produce said forces in said roadway surface in combination with a plurality of said additional capabilities. Persons with ordinary skill in the art routinely plan, highways and roads to minimize travel delays. However, the prior art does not describe a comprehensive system designed to sustain traffic flow from the point of entering the infrastructure to the moment of disembarking in a parking facility such that mean time between system failure in a metropolitan area is greater than one thousand hours. System failure in this instance is defined as any roadway incident that results in travel time more than double the planned duration for re-routed vehicles. Johnson provides detailed design criteria for a system using linear induction motor to launch aircraft. However, prior art does not describe integration of air travel based on linear induction drive within a transportation infrastructure where stop and wait delays during travel to airport, parking, ticketing, luggage transfer, passenger loading, passenger unloading and ground transportation to final destination do not occur. Neither does prior art contemplate passenger aircraft accelerated using linear induction drives to a velocity of up to 4,000 meters per second or elimination of aircraft fuel burning except for airport approach and landing. Additional art not previously described is extension of linear induction drive aircraft launch methods to 9,000 meters per second spacecraft launch.

2 SUMMARY

Transportation infrastructure comprises linear induction drives wherein a roadway surface is induced to simultaneously exert forward, lateral, levitation and three axis angular alignment forces on a vehicle and wherein a vehicle is capable of inducing roadway surface currents that produce said forces in said roadway surface. Comprehensive system sustains continuous traffic flow from the point of entering the infrastructure to the moment of disembarking in a parking facility. Transportation infrastructure comprises integration of air and space travel with substantially reduced cost and transit time.

3 ADVANTAGES 3.1

In the USA, 120 Million workers spend on average one hour daily commuting. Considering lost productivity and the deleterious health effects of stressful travel, we may value that time at ten dollars per hour. An annual cost of 0.3 trillion dollars is incurred and adding non-commuting travel cost leads to a conservative estimate of 0.6 trillion dollars per year. By cutting travel time in half, Global RApid Transit Infra-Structure (GRATIS) will save Americans 0.3 trillion dollars per year. GRATIS will; pay for itself many times over, reduce energy consumed for transportation, improve air quality, improve quality of life, enhance American competitiveness and provide many additional benefits described in the disclosure.

3.2

Core technology is linear induction drives cooperating with vehicles that can move back and forth seamlessly from legacy surface roads to GRATIS roadways. A passenger enters vehicle at home and exits within easy walking distance of the workplace or other destination. Travel time is reduced by; increased velocity on roadways, comprehensive integration of interconnected roadways to eliminate stop and go effects, pervasive urban penetration, ample parking and integration of parking with destination access. GRATIS also embodies high speed long distance travel. Supporting technologies include; linear induction motors for 2 axis drive, levitation, vehicle-in-motion battery charging, high strength-to-weight roadway enclosures, means of reducing air pressure surrounding long distance high speed trains, means of launching aircraft carrying GRATIS compatible passenger modules, broad band communications with vehicles in motion and individually optimized trips. GRATIS further comprises integration with space access based on linear induction drive launch surface. Other advantages of one or more aspects will be apparent from a consideration of the drawings and ensuing description.

4 DRAWINGS—FIGURES 4.1

5 DETAILED DESCRIPTION 5.1

The term "roadway", as used in this description and accompanying claims, shall be defined to mean a conductive surface in which current loops impart forward, reverse, lateral and levitation forces to vehicles. Roadways operate in cooperation with vehicles having electromagnetic drive elements capable of inducing said current loops in said surface. In addition to the conductive surface, roadways have supporting elements to maintain structural integrity and bear the weight of vehicles. Roadways are pervasive throughout a transportation infrastructure according to the invention. Roadways have in common similar hardware for central infrastructure automatic driving and vehicle control, including means of sensing vehicle location, direction and speed. In a preferred configuration, vehicle control systems are embedded in roadways, with overall system coordination via communications to vehicles and to central traffic oversight facilities. Regenerative deceleration is used throughout GRATIS roadways and means of transmitting energy to vehicles and high speed long distance trains for battery recharging are pervasive.

5.2

Figure 1:
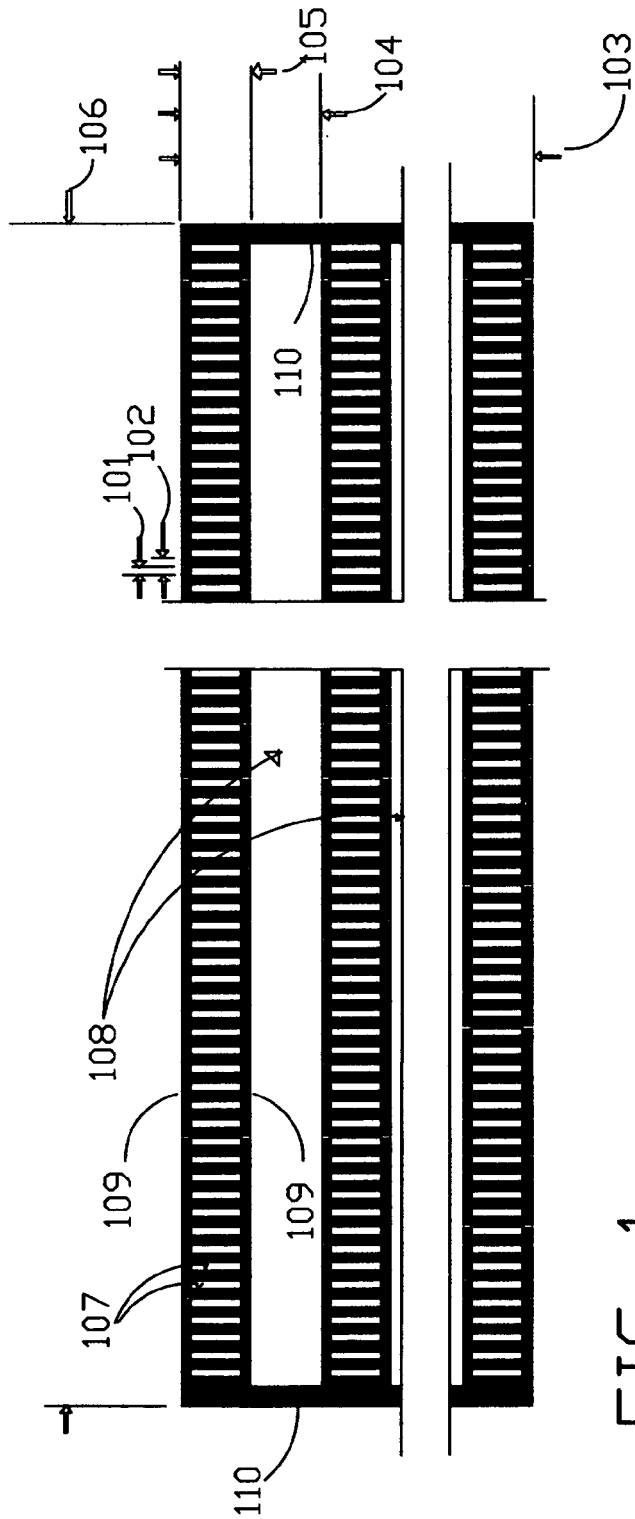
FIG. 1 shows a conducting roadway surface with coarse structure appropriate for generating current loops that will drive vehicles in forward, reverse or levitation directions and fine structure appropriate for generating current loops that will drive vehicles laterally or in levitation.

A preferred roadway conductive surface is illustrated in FIG. 1. The dark portion represents conductive material and the clear portion represents non-conductive voids in said conductive surface. The conductive surface has a nested pattern of non-conductive voids defining current loop pathways through conductive strips of the conductive surface surrounding the voids. The nested pattern includes i) a coarse pattern where each coarse void 108 is rectangular with a long dimension transverse to the primary direction of travel and a short dimension parallel to the primary direction of travel so as to form an array of coarse conductive strips and ii) a fine pattern in each of the coarse conductive strips where each fine void 107 is rectangular having a long dimension in the primary direction of travel. Repetitive fine structure non-conductive voids with pitch 102 and width 101 are disposed in an array perpendicular to primary direction of vehicle travel on roadway. On both edges of each fine structure conductive strip array, a first conductive border 109 allows completion of electrical circuits through conductive surface surrounding the voids in which current can be induced by magnetic field changes produced by drive coils on a vehicle. Fine structure conductive strip array induced currents in turn produce forces on the vehicle when drive coils on said vehicle produce magnetic fields orthogonal to direction of current in fine structure conductive strips. The direction of force is perpendicular to conductive strips, having components in lateral and vertical directions. Repetitive coarse structure voids 108 with pitch 104 and separation 105 are disposed in an array parallel to the primary direction of vehicle travel. A complete array of fine structure conductive strips comprises a single coarse structure conductive strip. On both edges of each coarse structure conductive strip array, a second conductive border 110 allows completion of electrical circuits in which current can be induced by magnetic field changes produced by drive coils on a vehicle. Coarse structure conductive strip array induced currents in turn produce forces on the vehicle when drive coils on said vehicle produce magnetic fields perpendicular to direction of current in coarse structure conductive strips. The direction of force is perpendicular to conductive strips, having components in forward and vertical directions. Depending on driver coil phase, the coarse structure force may alternatively be in the reverse direction. The pitch of driver coil pole faces that produce vehicle lateral forces by magnetic interaction with fine structure conductive strips in a preferred embodiment is approximately equal to pitch 102 and orientation of said pole faces is substantially parallel to said fine structure conductive strips. The pitch of driver coil pole faces that produce vehicle forward forces by magnetic interaction with coarse structure conductive strips in a preferred embodiment is approximately equal to pitch 104 and orientation of said pole faces is substantially parallel to said coarse structure conductive strips. The larger scale and orientation of coarse structure driver coils are such that negligible lateral vehicle force results from their action. Likewise, the smaller scale and orientation of fine structure driver coils are such that contribution of fine structure coils toward forward motion averages to substantially zero. Dimension 103 is the length in vehicle travel direction of an individual roadway tile. Dimension 106 is the width orthogonal to travel direction of an individual tile. Each tile has a layer of high magnetic permeability material located on said tile underside and separated from said conductive surface by a thin non-conductive material to complete a magnetic circuit around conductive strips. In a preferred embodiment, said high permeability material is composed of high permeability sheets laminated together with alternating layers of non-conducting material. The plane of each high permeability sheet is parallel to primary direction of travel and perpendicular to conductive surface. This orientation favors completion of magnetic circuit around coarse structure conductive strips, thereby enhancing vehicle forward drive function. Lateral drive is also enhanced by magnetic loop closure but to a lesser degree due to interruptions in high permeability caused by non-conducting material laminations. Favoring forward drive is a reasonable system trade because the required lateral forces are much smaller than forward drive forces. The purpose of lamination is to reduce eddy current losses in the vehicle drive. A plurality of tiles are set side by side horizontally to constitute a single roadway lane section. A plurality of roadway sections are extended along the entire roadway and most roadways have a plurality of lanes. In a preferred embodiment, there is no difference in the space between tiles associated with laterally adjacent lanes and space between laterally adjacent tiles within a given lane, resulting in smooth continuous vehicle operation while passing from lane to lane. In preferred embodiments, dimensions typically fall in the ranges given in the table below.

| Name | Reference Numeral | Minimum Value (meters) | Maximum Value (meters) |
|---|---|---|---|
| Fine conductor pitch | 102 | 0.001 | 0.004 |
| Fine conductor separation | 101 | 0.0005 | 0.002 |
| Coarse conductor pitch | 104 | 0.02 | 0.2 |
| Coarse conductor width | 105 | 0.01 | 0.1 |
| Tile length | 103 | 1.0 | 5.0 |
| Tile width | 106 | 0.2 | 1.6 |
| High permeability layer thickness | 211 | 0.001 | 0.01 |

5.3

Figure 2:
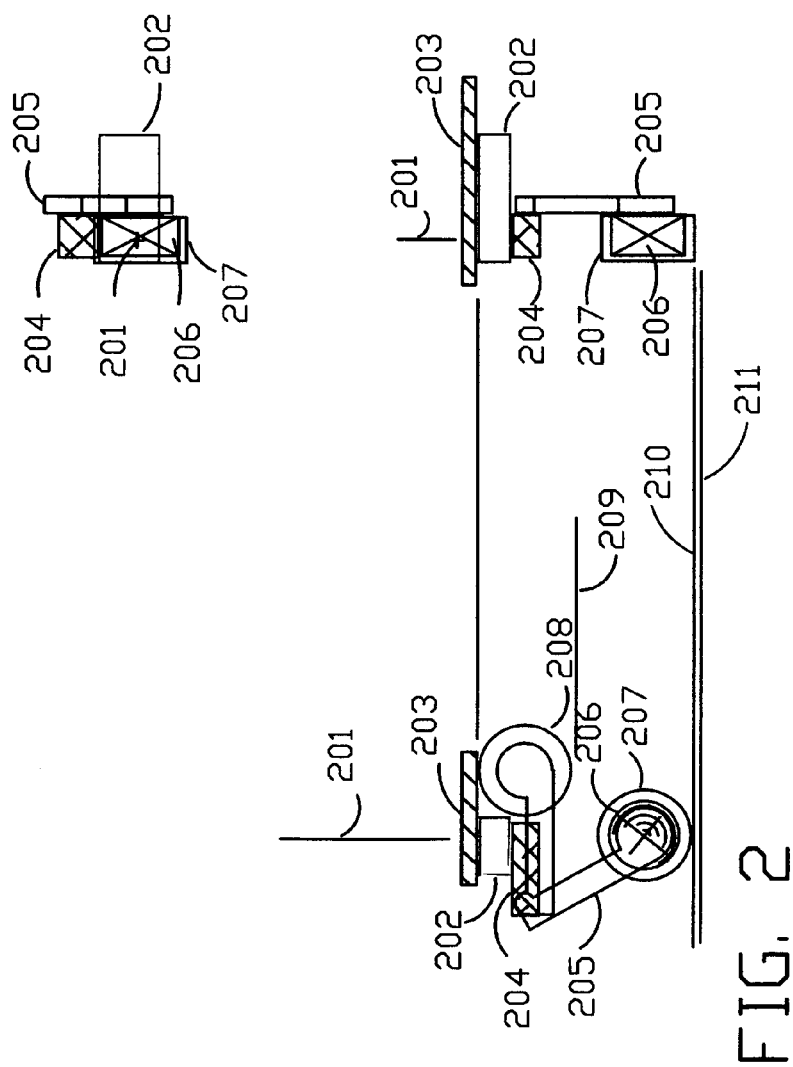
FIG. 2 shows in three views means of turning wheel, steering, providing suspension with wheel extended and retracting wheel to deploy driving forces in cooperation with conductive roadway surface.

FIG. 2 shows in three views preferred means of turning vehicle wheel 207 via motor M3 206 steering via motor M1 202 and deploying wheel strut 205 via Motor M2 204. Wheel 207 steers about vertical axis 201. Steering motor M1 202 is attached to vehicle underside surface 203 in wheel well. Motor M2 204 provides suspension with wheel extended and holds wheel in retracted position 208 to deploy linear motor driving forces in cooperation with conductive roadway surface. Vehicle linear drive elements are at level 209 when vehicle drives on legacy roads. When wheel is retracted 208 level 209 lowers to ride just above roadway conductive surface 210. High magnetic permeability lamination layer 211 discussed above with reference to FIG. 1, lies under roadway conductive surface 210. In a preferred embodiment, vehicles employ extended wheels on legacy streets and roads, then retract wheels while continuing forward motion and engage linear electromagnetic drive as vehicles transfer to roadways in a smooth transition with no requirement for pausing to reconfigure. In addition, the wheel assembly shown in FIG. 2 enables; 1) a very sharp turning radius including rotation in place about any vertical axis, 2) lateral motion into a parking space with only centimeters of vehicle clearance, 3) incorporation of suspension, 4) shock absorption, 5) level adjustment, 6) electronic braking and 7) road tilt compensation. Combining these functions into one assembly will contribute to reduced parts count, improved reliability and reduced vehicle cost. Vehicles in a preferred embodiment according to the invention have the following characteristics; 1) rechargeable battery electric power, 2 ability to rapidly switch configuration between electric motor driven wheels for operation on existing roads and retracted wheels with linear drive motors for use on GRATIS roadways, 3) Interface to automatic driving and route planning that takes control when vehicle enters GRATIS system, 4) low friction under surface cooperating with low friction roadway surface to minimize energy loss in the event of vehicle roadway contact, 5) means of latching to adjacent vehicles on sides, rear and front end to facilitate close convoy and emergency towing, 6) communications and display equipment comparable to home or office and 7) passenger modules that i) may be removed from vehicle for independent movement or conveyance aboard other vehicles, ii) provide means of tilting passengers back to reduce deceleration discomfort and iii) comprise a versatile communications interface that is detachable from vehicles.

5.4

Figure 3:
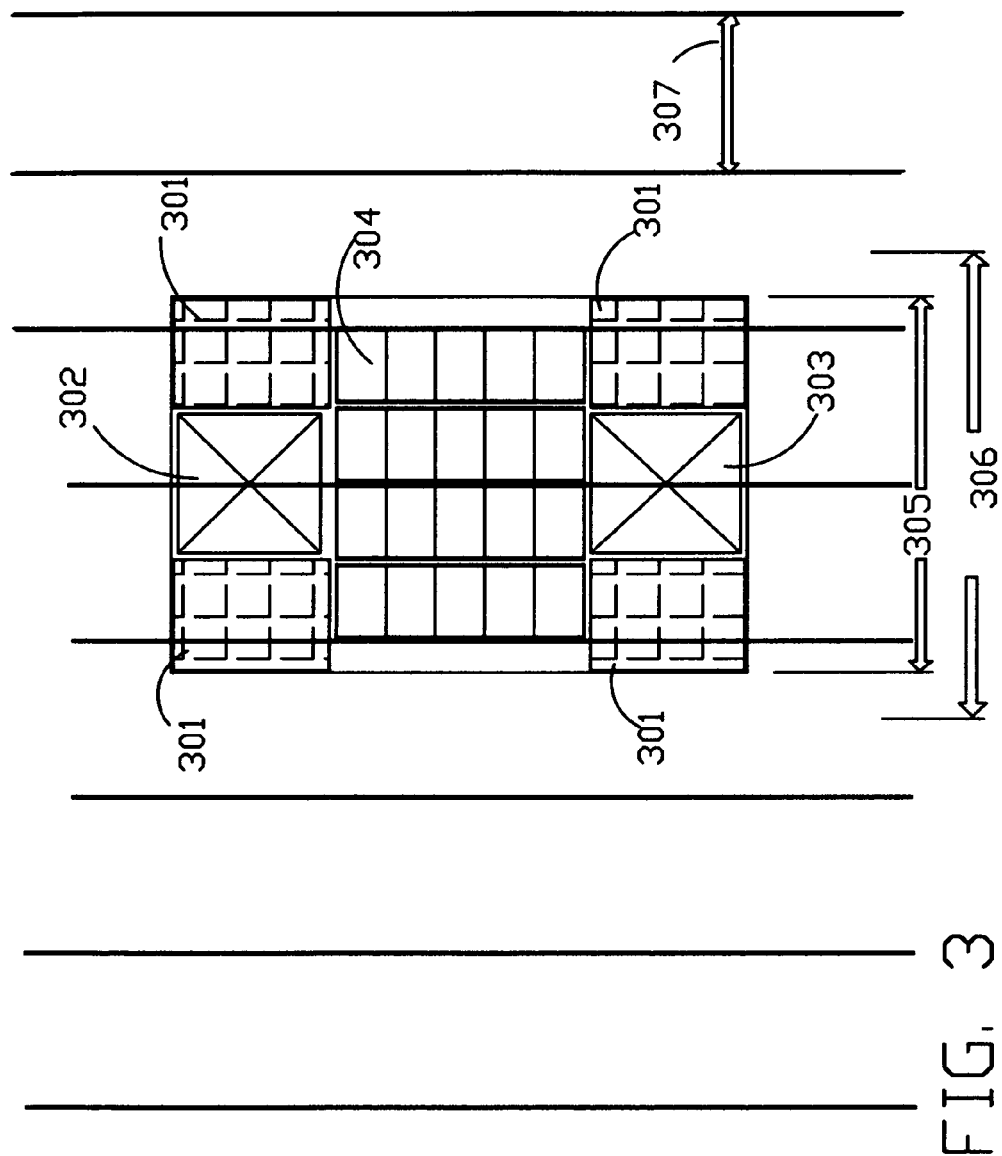
FIG. 3 shows vehicle bottom surface indicating preferred zones for linear induction drivers devoted to producing forward, reverse or levitation forces, preferred zones for linear induction drivers devoted to producing lateral or levitation forces and preferred wheel well locations.

FIG. 3 shows vehicle bottom surface indicating preferred zones 304 for linear induction drivers devoted to producing forward, reverse or levitation forces, preferred zones for linear induction drivers devoted to producing lateral or levitation forces 302, 303 and preferred wheel well locations 301. Providing independent control of translation and levitation in three or more separated zones enables control of vehicle angular orientation in three axes; i) turning vehicle in azimuth about a vertical axis ii) rotating vehicle in roll about an axis parallel to the primary direction of travel iii) rotating vehicle in elevation about an axis perpendicular to the primary direction of travel. Dimensions for vehicle width 305 lane width 306, and roadway tile width 307 are indicated in FIG. 3. Tile width 307 is the same as tile width 106 in FIG. 1. In preferred embodiments, dimensions typically fall in the ranges given in the table below.

| Name | Reference Numeral | Minimum Value (meters) | Maximum Value (meters) |
|---|---|---|---|
| Vehicle width | 305 | 0.8 | 4.5 |
| Lane width | 306 | 2.0 | 5.0 |
| Tile width | 307 | 0.2 | 1.6 |

5.5

Roadways include long distance train lines, high speed lines, local lines, mixing bowls and intra-city lattice elements. The term mixing bowl refers to a preferred arrangement of roadways for connecting traffic flow from a plurality of feeding roadways to a plurality of continuing roadways. Vehicle velocity changes several times during passage through a mixing bowl. Other roadways are characterized in a preferred embodiment by approximate peak sustaining velocities shown in the table below.

| Roadway elements | Approximate peak velocity | | |
|---|---|---|---|
| | Meters per second | Km per hour | Miles per hour |
| Long distance train lines | 2,000 | 7,200 | 4,500 |
| High speed lines | 100 | 360 | 225 |
| Local lines | 40 | 144 | 90 |
| Intra-city lattice elements | 20 | 72 | 45 |

5.6

A noteworthy fact about vehicles moving on a roadway is reduction in the force of gravity by a centrifugal force associated with the roadway radius of curvature. Further, Earth rotation adds a term to the effective vehicle velocity with magnitude equal to the dot product of roadway velocity vector relative to Earth center with the unit vector in the direction of vehicle motion; $(\Delta V = V_r \cdot U)$. For example, the radius of curvature on a North latitude 38.58 degrees long distance train line from Sacramento, Calif. to Washington, D.C. is approximately 5,000 Kilometers and the roadway Earth centered velocity is approximately 365 meters per second in the due East direction. In this example, vector addition of centrifugal force on a train moving due East at 2,000 meters per second and the force of gravity results in a 9% reduction in downward force and a small Southward force. The downward force reduction is useful in construction of roadways inasmuch as the roadways need not be designed to support the full weight of fast moving vehicles. Also, the ability of roadways to exert lateral force on vehicles is useful in countering the Southward centripetal force component on high velocity trains. Prior art does not teach criteria or methods for balancing gravity, Earth radius centrifugal and linear induction forces in roadway and vehicle design.

5.7

In a second preferred embodiment, permanent magnets are disposed on vehicle underside, producing a levitation force against roadway that works in cooperation with linear induction drive elements.

5.8

Vehicles according to the invention may be configured to carry diverse objects. For example, a first carrying vehicle with retractable wheels as described above with reference to FIG. 2 may be able to pass under a second carried vehicle, block the wheels of said carried vehicle or otherwise secure said carried vehicle to top surface of said first carrying vehicle. Thereupon, said first carrying vehicle moves said second carried vehicle along ordinary road surfaces to a remote location. Under automatic control, said carrying vehicle is capable of moving said carried vehicle with, no driver present from a passenger disembarkation station to a parking space using forward, reverse and lateral motion in a manner that allows maximum packing efficiency of vehicles in an existing parking facility without requiring structural modifications to said parking facility. In facilities having roadway surfaces as described above with reference to FIG. 1, said carrying vehicle may be equipped with linear induction drivers and operate as described above with reference to FIG. 3. In another preferred embodiment, said first carrying vehicles may convey said second carried vehicles from one end to another of a section of roadway according to the invention. In this way, ordinary vehicles are enabled to pass back and forth from conventional roads to sections of GRATIS roadway. Early adapter traffic jurisdictions thereby reap the benefit of reduced congestion on legacy transportation infrastructure while introducing GRATIS in an incremental cost effective manner.

5.9

Figure 4:
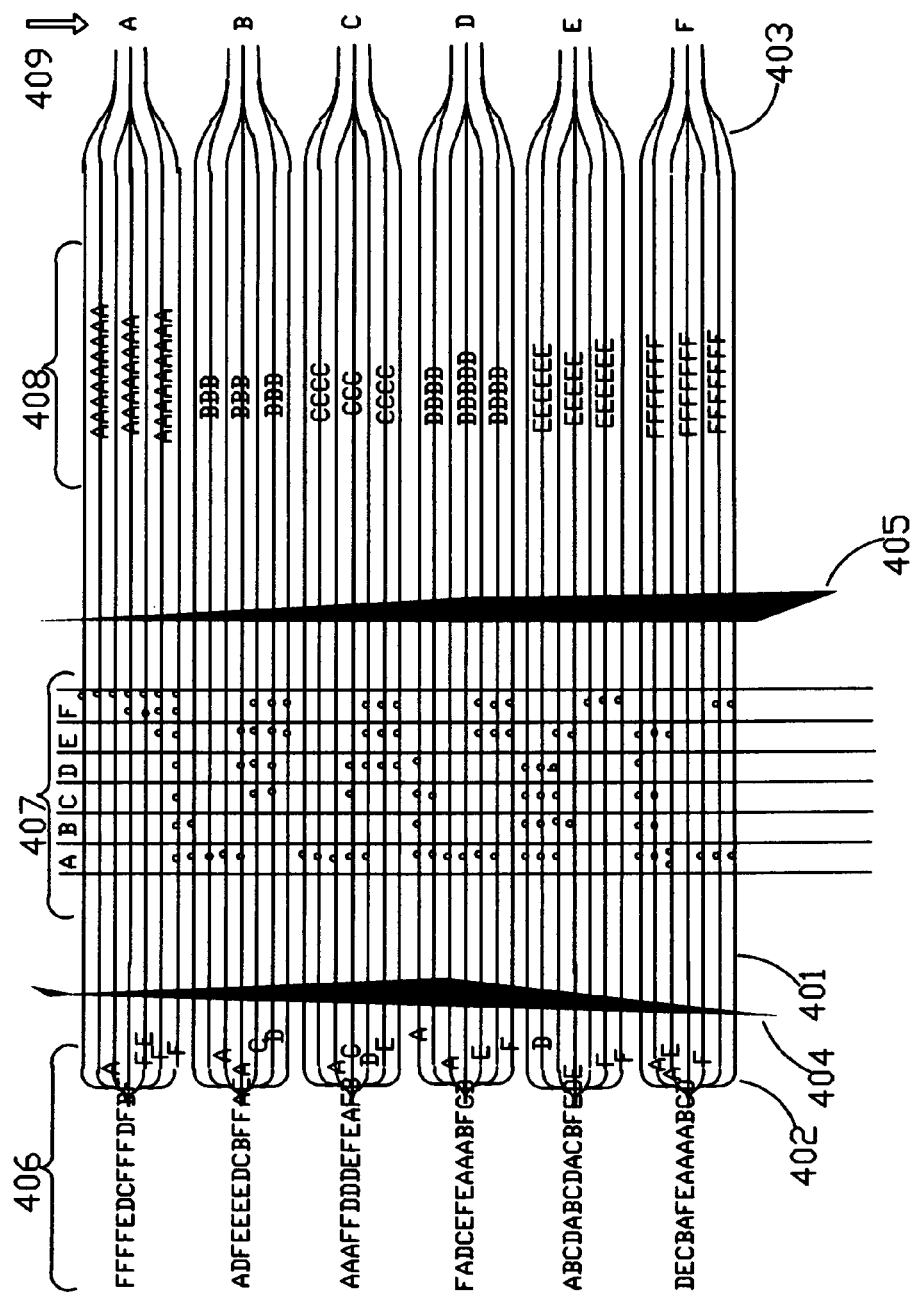
FIG. 4 shows preferred layout for a traffic mixing bowl in which vehicles enter from several first ports and sort themselves to prepare for, exit into several second ports.

FIG. 4 illustrates traffic flow in a mixing bowl according to a preferred embodiment of the invention. A parallel array of roadways 401 extends the full mixing bowl central length. As an example, FIG. 4 shows branching of a typical feeding roadway into seven branching roadways 402 that continue to the mixing bowl exit where a convergence 403 prepares vehicle traffic to connect with forward destinations. Within FIG. 4, roadway array 401 is foreshortened at break lines 404 and 405. Said break lines divide FIG. 4 into discrete instants of time (t); 1) at t=0 seconds a possible, cohort of vehicles 406 is shown entering the mixing bowl as an example, 2) at t=10 seconds said vehicle cohort, shown in snapshot 407 has fanned out into rows on parallel roadways, 401 3) at t=50 seconds said cohort, now shown in snapshot 408 has formed into columns staged in front of mixing bowl exit gates 409. Cohort 406 vehicles are identified by letters A through F indicating which exit gate 409, a given vehicle will use. Exit gates 409 are labeled accordingly with letters A through F. In snapshot 407, rows of vehicles are divided according to exit gate plan with letters A through F indicating which gate a given row will use.

5.10

Features of mixing bowls in a preferred embodiment include; 1) means of sorting entering traffic into vehicle lines ready to enter ongoing or terminal lines with diverse destinations, 2) sufficient lanes to maintain the system wide aggregate vehicle flow rate while reducing speed at entry with a safety factor that accommodates variable fractions of vehicles heading for a given exit and 3) approximately 20 meters/second forward and 5 meters/second lateral target speeds in central mixing area.

5.11

Figure 5:
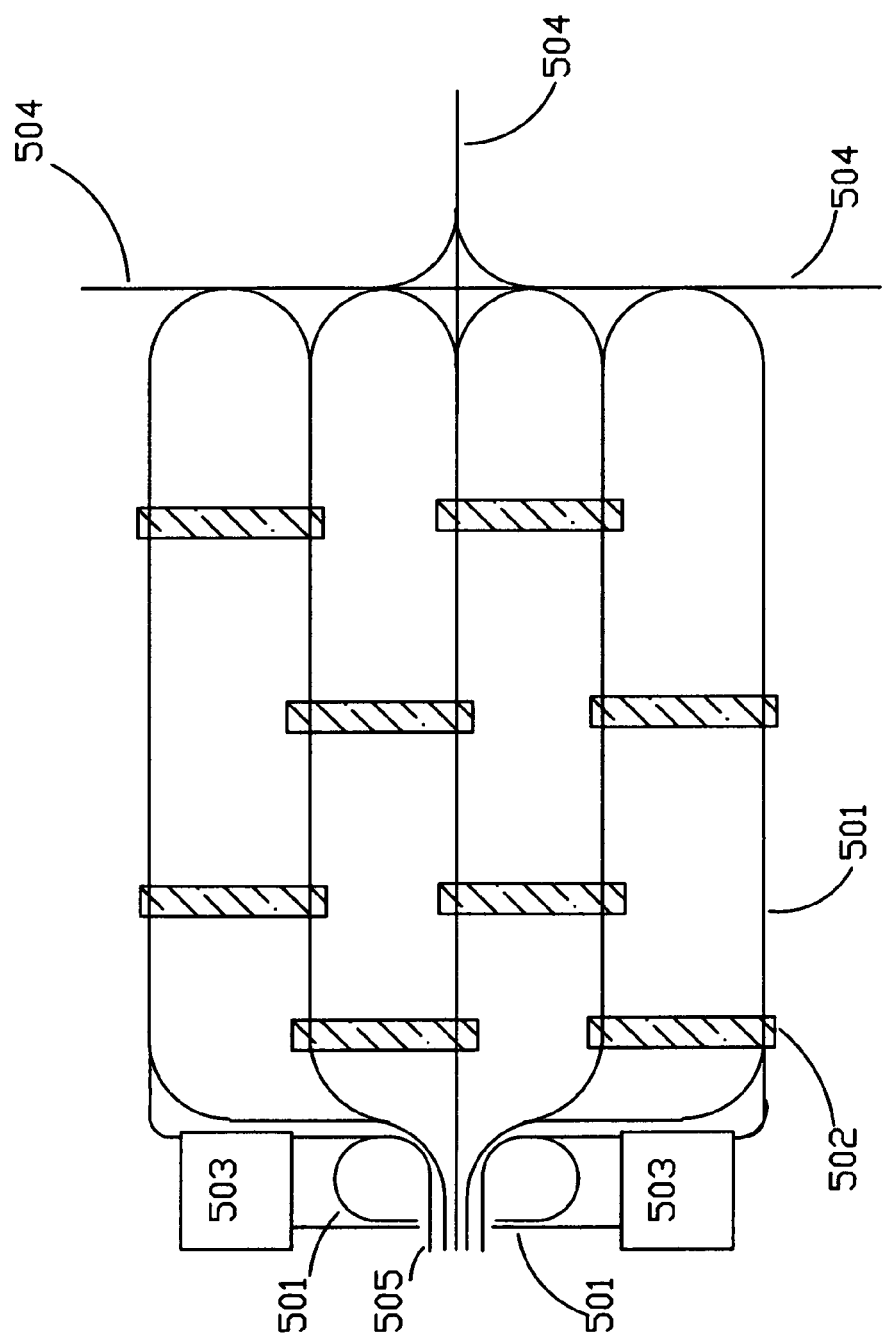
FIG. 5 shows an intra-city roadway lattice providing rapid access and convenient parking close to all city locations within a zone.

FIG. 5 shows a local connection 501 lattice network of the kind that may advantageously permeate urban neighborhoods in a preferred embodiment of the invention. Neighborhood parking facilities 502 are interspersed at regular intervals throughout an urban zone. Large scale parking facilities 503 are strategically placed with immediate access from intra-city roadway network entry 505. Continuing roadways 504 connect to adjacent zones or to more distant destinations. Neighborhood parking facilities 502 incorporate; 1) sufficient parking to accommodate the average neighborhood load plus a safety factor, 2) passageways to and from legacy urban streets, 3) buffer zones to accommodate traffic inflow surges, 4) automated docking to passenger unloading zones that connect with pedestrian walkways leading on to nearby buildings and streets, 5) automated vehicle transfer to densely packed parking spaces that are assigned to optimize retrieval based on information provided by vehicle drivers, 6) vehicle and pedestrian cross-connections to laterally adjacent parking facilities that accommodate overflow in any given, neighborhood, 7) provisions for returning to a point of origin and 8) connections to roadways that continue any desired travel plan passing through an urban neighborhood. Large scale parking facilities 503 provide all of the features cited for neighborhood parking and in addition; 1) parking capacity sized to accommodate public gatherings of many kinds, 2) buffer zones designed to keep vehicles moving into the facilities 503 and accommodate occasional surges in traffic volume on roadways in entry 505 to intra-city roadway network and 3) local connections to nearby alternate large scale parking facilities. In a preferred embodiment, new construction occurs in the air above existing infrastructure. Preferred design calls for a lattice of roadways and parking structures permeating the sky above existing buildings. The bridging structures associated with this roadway lattice use similar materials and follow similar design guidelines to those needed for long distance runs. Columns may be placed near foundations of existing buildings as exoskeletons or new free standing construction with minimum footprint. In a preferred embodiment, lateral support derives from crossing lattice elements, at roadway elevation and anchors at lattice edges.

5.12

Features of said lattice network in a preferred embodiment include; 1) immediate left and right high velocity exit lanes into high capacity parking facilities having traffic buffer zones, connections forward into distributed neighborhood lattice elements and sufficient parking capacity to accommodate large gatherings, 2) deceleration zone where vehicles fan out into multiple lanes according to ultimate destination, 3) further line branching to produce massive parallel flow across a broad front into city interiors, 4 dense grid of neighborhood parking facilities that bridge adjacent travel lines, provide automatic parking, forward vehicles to passenger selected departure points and move people to their final destination and 5) means to automatically park vehicles after passengers disembark at legacy street level.

5.13

Figure 6:
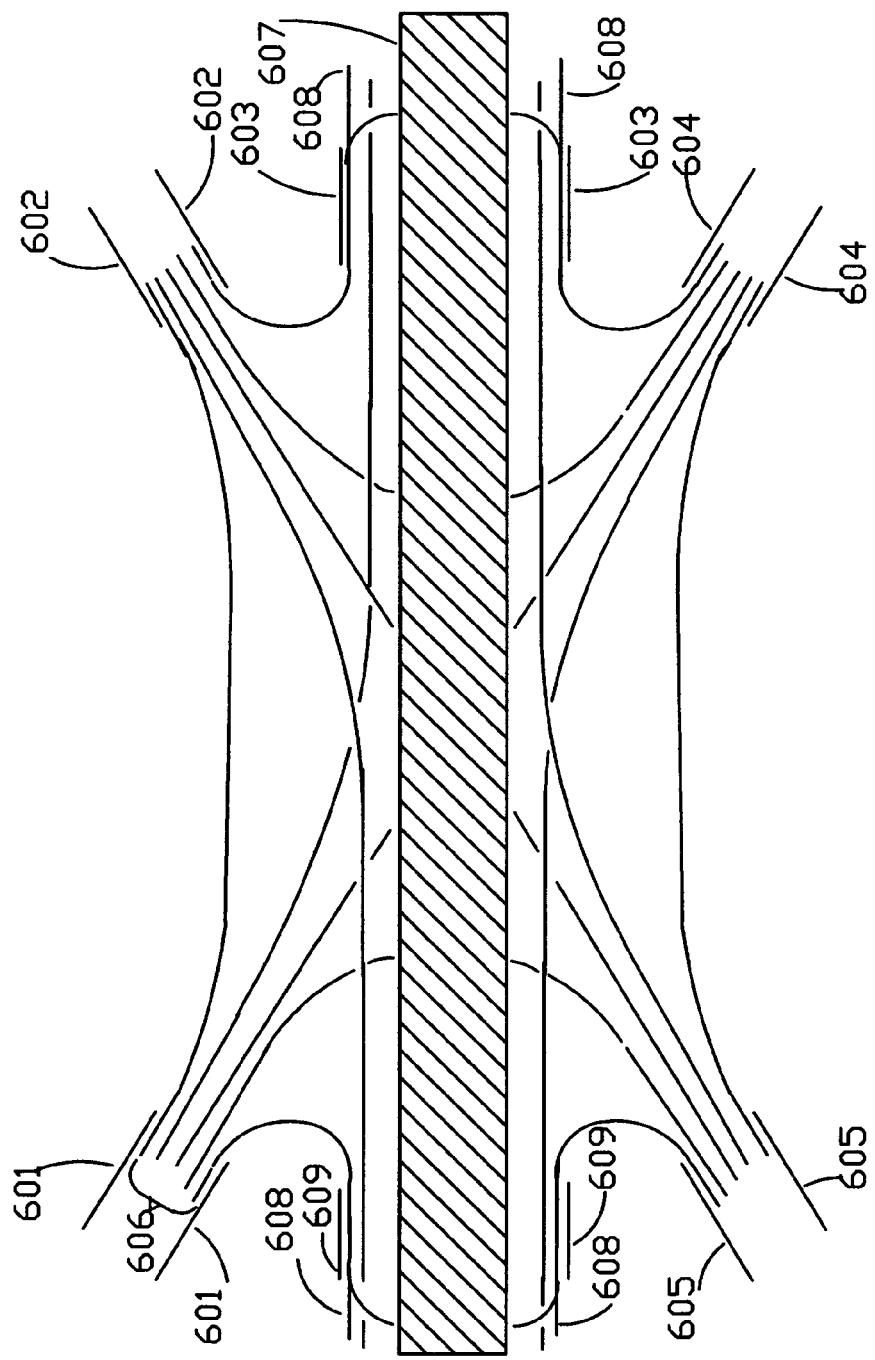
FIG. 6 shows a typical intersection with bidirectional access to and from every connecting, roadway.

FIG. 6 shows a preferred roadway intersection arrangement. Traffic on high speed roadway lines 607 passes through the intersection without slowing. At least one of the roadways entering intersection from within first boundaries 601 is able to pass on through each of the other boundary pairs 602, 603, 604, 605 and 609. Similarly, at least one roadway entering any of boundary pairs 602, 603, 604, 605 or 609 has access to each of the remaining boundary pairs. All roadways shown in FIG. 6 are bidirectional. Roadways 608 provide local access to and from high speed roadway lines 607. Traffic entering a high speed roadway line runs parallel while accelerating to match velocity, then merges. Traffic exiting a high speed roadway line splits off to parallel lanes then decelerates to join local and intersecting traffic.

5.14

Figure 7:
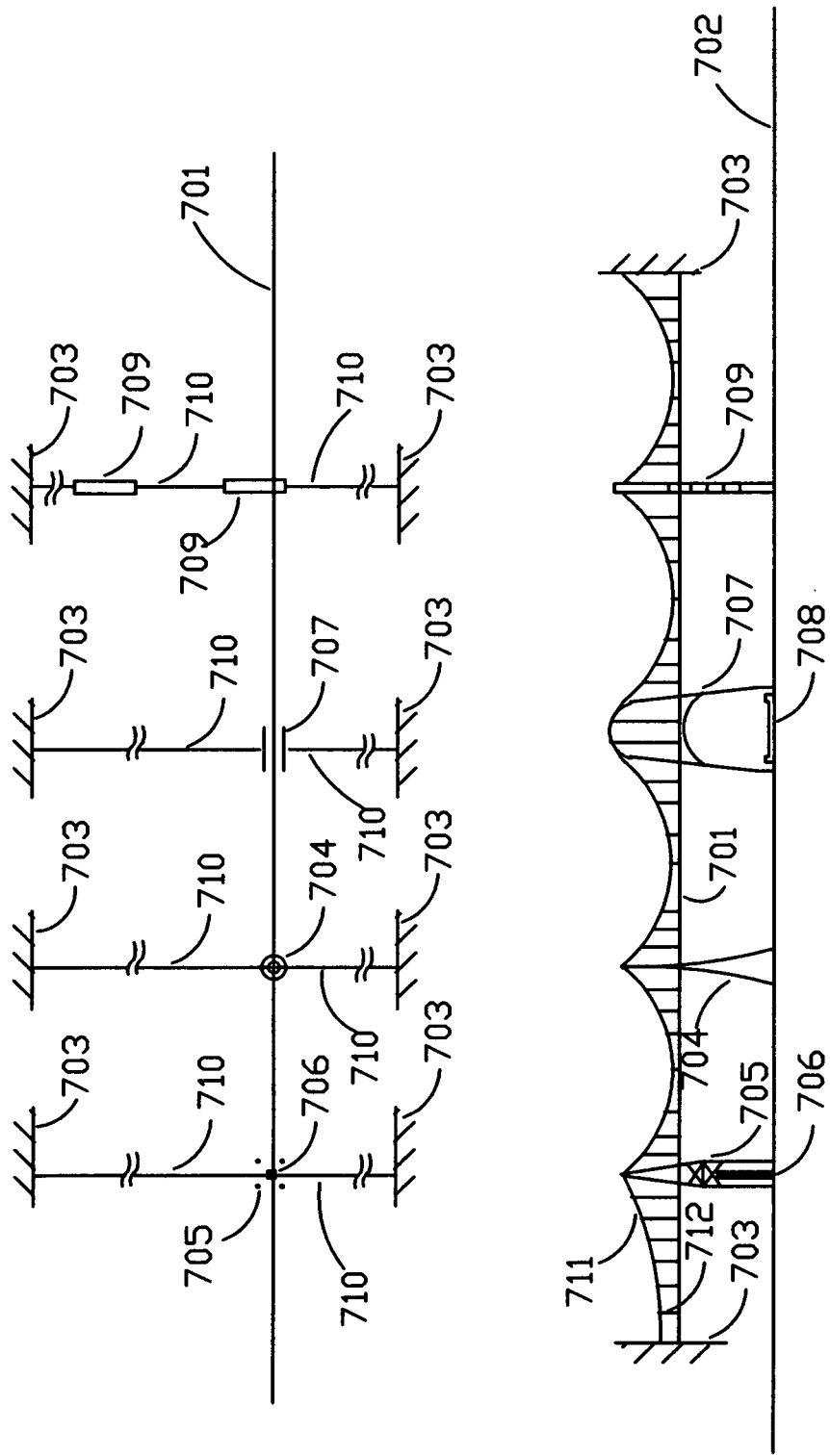
FIG. 7 shows several structural configurations through which primarily tension elements provide lateral and vertical stability to roadways.

FIG. 7 shows several preferred means by which lateral support is provided to a roadway 701 that is elevated above ground plane 702. In order to reduce mass and cost of roadway infrastructure, lateral support is provided in preferred embodiments using tensile elements 710, anchored at remote points 703. Preferred means of providing vertical support include; 1) hollow section free standing pillar 704, 2) exoskeleton pillars 705 around existing building 706, 3) bridge 707 over conventional road and parking structure 709 walls. Parking structure 709 walls may also serve as intermediate anchor points for tensile elements 710. In addition to the vertical support provided by pillars and walls, vertical support that maintains roadways in a straight horizontal line is provided in a preferred embodiment by catenary tensile suspension elements 711 and vertical tensile elements 712, suspended from said catenary elements.

5.15

An important objective of the invention is to provide roadways on which every trip is planned in advance with high confidence that no stopping or slowing below target velocities will occur. Such confidence springs in part from roadway and infrastructure design based on modeling and simulation.

5.16

Roadway configurations include on-ramps, local lines, high speed lines, mixing bowls, connecting roadways, roadways within large scale parking facilities, roadways within neighborhood, parking facilities and intra-city lattice roadway elements. In a preferred embodiment, modeling and simulation is used to design an infrastructure that meets all objectives of the invention. In the table below, capital letters in the Rules column refer to the following vehicle traffic rules; A) reduce speed upon entering roadway element, B) fan out into multiple lanes per starting lane upon entering roadway element, C) form rows after entering roadway element, D) shift rows laterally and place vehicles in lanes lined up with exit lanes then accelerate toward exit to reach a target velocity associated with the subsequent roadway element, E) Shift into a slower moving lane as required, in order to avoid forcing following vehicles to reduce speed, F) Pass forward to a continuing roadway in, order to avoid creating congestion among following vehicles, G) Match vehicle velocity with moving vehicle disembarkation ramp and disembark vehicle passengers and H) Match velocity in vehicle lane to conveyor velocity, then transfer passenger module to or from conveyor. Numbers in the second row refer to the following roadway configuration elements; 1) on-ramp, 2) local line, 3) high speed line, 4) mixing bowl, 5 connecting roadway, 6) roadway within large scale parking facility, 7) roadway within neighborhood parking facility, 8) intra-city lattice roadway elements and 9) train loading conveyor. Yes or No entries in the body of the table indicate whether or not a given lettered traffic rule applies to a given numbered roadway configuration element.

| Rules | Roadway elements | | | | | | | | |
|---|---|---|---|---|---|---|---|---|---|
| | 1 | 2 | 3 | 4 | 5 | 6 | 7 | 8 | 9 |
| A | Yes | No | No | Yes | Yes | Yes | Yes | Yes | No |
| B | Yes | No | No | Yes | Yes | Yes | Yes | Yes | Yes |
| C | Yes | No | No | Yes | Yes | No | No | No | No |
| D | Yes | No | No | Yes | Yes | No | No | No | No |
| E | Yes | Yes | Yes | No | Yes | Yes | Yes | Yes | Yes |
| F | Yes | Yes | No | Yes | Yes | Yes | Yes | Yes | No |
| G | No | No | No | No | No | Yes | Yes | Yes | No |
| H | No | No | No | No | Yes | No | No | No | Yes |

5.17

A preferred method for design of roadway infrastructure uses simulation and modeling algorithms. For each on-ramp within a given municipal area, polling is conducted to make an assessment of the probable percentage of entering vehicles that will plan to travel to each of the possible exit points. This data is used to estimate traffic flow for all roadway components in the municipal area and set nominal component lengths, lane counts and velocity profiles. Separately, an estimate is made of construction cost per Kilometer of roadway lane. Cost and component configuration data lead to an estimate of municipal area infrastructure total cost. For each infrastructure component, run simulations to determine; 1) frequency of re-routing requirement, 2) statistical distribution of trip duration changes due to re-routing, 3) sensitivity of re-routing statistics to one added lane in highest traffic density zone of component and 4) sensitivity of re-routing statistics to increasing lane length in highest traffic density zone. Make component level simulation results available to overall municipal area infrastructure optimization on demand.

5.18

For the purposes of this invention, continuous optimization is defined as a set of linear equations and finding a solution to said equations that determines a global minimum in a merit function. At the overall infrastructure level, use continuous optimization to minimize municipal infrastructure figure of merit (M) where the linear equations relate trip time to lane count or lane length and:

$$M = (\text{System cost per traveler}) * (\text{Average trip time}).$$

Along with merit function, M, said continuous optimization determines design values for all component lane counts and lane lengths.

5.19

After calculating merit function, M, said preferred method for design of roadway infrastructure proceeds to run further simulations to determine a municipal area infrastructure level mean time between failure (MTBF). For the purposes of this invention, a municipal area infrastructure level failure shall be defined as a single root cause event where one or more vehicles experiences more than double the trip time that was projected on entry into the infrastructure. When simulations have been run for one million hours using the optimized component designs, MTBF is measured. If MTBF is more than 1,000 hours, the optimization solution is, accepted and design values are used to construct the infrastructure. If MTBF is less than 1,000 hours, component roadway lane lengths and lane counts are increased, giving priority to components having highest incidence of soft failures and the optimization process repeats beginning at the metro area cost estimation step. The iteration is continued until MTBF greater than one thousand hours is achieved or the design authority decides to accept a reduced MTBF criterion for design completion. The infrastructure design is then complete according to the invention.

5.20

Long distance train lines according to the invention possess the following characteristics; 1) target train cruising speed is 2,000 meters/second, 2) travel in each of two opposite directions occurs in a chamber isolated from the outdoors and from the other direction, 3) trains have front and rear ends designed to minimize hypervelocity drag and noise, 4) trains present smooth sides to surrounding atmosphere, 5) atmospheric pressure around trains is reduced to counter drag and noise effects, 6) trains have pressurized interior, 7) trains carry batteries for electric drive power, 8) trains exit low pressure enclosure to pick up and discharge passengers, vehicles and passenger modules, 9) trains have long sharp noses and tails that cooperate with rapidly opening or closing iris style doors to minimize atmospheric pressure air entry into low pressure enclosure, 10) said iris style doors are a close fit to train circumference to further limit atmospheric pressure air entry into said enclosure and 11) linear induction elements embedded in floor under trains cooperate with train mounted linear motors to generate forces that accelerate, decelerate, guide laterally and levitate trains 5.21

A distinctive feature of long distance train lines is that curves are very gradual. This characteristic stems from the extremely high velocity that trains are expected to attain. Along with the requirement for globally straight lines, the roadway lanes and structures housing them must be precisely straight locally so that trains will not be subjected to lateral disturbances during transit. In order to accommodate the gradual curve requirement, long distance lines will, in a preferred embodiment, be constructed as bridges above the ground, high enough that local terrain imposes no constraints on roadway placement. In a preferred embodiment, bridging structures are fabricated from extremely light weight materials in order to avoid prohibitively voluminous structures. The design for light weight includes maximum use of tensile supports, including adjustable tension members to compensate for variable wind loading. In addition, innovative compressive materials and foundation systems will be used in preferred embodiments in order to place the roadways high in the air and carry the traffic loads at design altitude. Design guidelines for bridge supports in preferred embodiments of the invention include; 1) exponentially diminishing section mass with height of columns, 2) use of hollow tubes to improve stiffness/mass characteristic, 3) mix of tensile and compressive coupling between columns and roadway as part of optimized column separation and 4) lateral stability obtained from guy lines and connections among crossing roadways 5.22

Characteristics of local lines in a preferred embodiment include; 1) target vehicle cruising speed is 40 meters/second, 2) two or more lanes are provided for a given travel direction, 4) opposite direction traffic is isolated by walls or separate levels, 5) connection to high speed long distance train lines is via customized access roadways having means of transferring moving vehicles or passenger modules to trains, 6) connection to legacy streets is via multi-lane buffer zone on-ramp roadways wherein traffic is controlled to bring vehicles with compatible destinations onto local lines in groups, 7) inter-sections embody level changing local line interconnections and 8) off ramps to mixing bowls, parking facilities and legacy streets are provided.

5.23

In a preferred embodiment; roadway infrastructure is integrated with air travel means. A preferred air travel approach includes; 1) elongated pressurized aircraft are fitted with stiffening members, wings, fuel tanks and jet engines for flight maintenance and landing, 2) linear induction elements embodied in aircraft structure cooperate with drive platform mounted linear motors to generate forces that accelerate aircraft for an extended distance, 3) air pressure is reduced in an enclosure around drive platform, 4) target aircraft drive platform exit velocity is 4,000 meters/second, 5) aircraft have front and rear ends designed to minimize hypervelocity drag and noise, 6) aircraft present smooth sides to surrounding atmosphere, 7) prior to takeoff, aircraft pick up passengers, vehicles and passenger modules outside low pressure enclosure, 8) aircraft have long sharp noses and tails that cooperate with rapidly opening or closing iris style doors to minimize atmospheric pressure air entry into low pressure enclosure, 9) said iris style doors are a close fit to train circumference to further limit atmospheric pressure air entry into said enclosure, 10) means of loading passenger modules and luggage directly from roadway vehicles onto aircraft are provided, 11) means of parking vehicle shells or moving them to designated destinations are provided, 12) means are provided for transferring passenger modules and luggage to compatible vehicle shells capable of traveling on GRATIS at aircraft destination and 13) terminal access to and from GRATIS ground vehicle system is provided.

5.24

In a preferred embodiment, GRATIS is integrated with access to space. A preferred approach includes; 1) elongated pressurized spacecraft are fitted with stiffening members, wings, fuel tanks and rocket engines for takeoff assistance and orbit modification, 2) linear induction elements embodied in spacecraft structure cooperate with drive platform mounted linear motors to generate forces that accelerate spacecraft for an extended distance, 3) air pressure is reduced in an enclosure around drive platform, 4) target aircraft drive platform exit velocity is 9,000 meters/second, 5) spacecraft have front and rear ends designed to minimize hypervelocity drag and noise during acceleration and initial passage through lower atmosphere, 6) sharp nose at front of spacecraft punctures a polymer sheet that maintains seal against outside air pressure until spacecraft arrives at drive platform exit, 7) spacecraft present smooth sides to surrounding atmosphere, 8) prior to takeoff, spacecraft pick up passengers and passenger modules outside low pressure enclosure, 9) means of loading passenger modules and luggage directly from road vehicles onto aircraft are provided and 10) means are provided for transferring passenger modules and luggage into orbiting facilities at spacecraft destination.

5.25

Many additional features and benefits of the invention will be obvious to those versed in the art.

I claim:

1. A roadway comprising a conductive surface disposed on a weight-bearing structure, said conductive surface operative to urge, in a primary direction of travel, a powered vehicle (a) disposed above said conductive surface and (b) having linear induction drive element arrays on a lower surface substantially parallel to and in close proximity to said conductive surface, said conductive surface having a nested pattern of regularly spaced non-conductive voids defining first and second current loop pathways in portions of said conductive surface surrounding said voids,
  wherein said nested pattern of voids includes:
    (i) a coarse pattern defined by an array of coarse conductive strips, each coarse strip having a long dimension transverse to said primary direction of travel, in combination with coarse conductive borders disposed transversely with respect to the long dimension of the coarse strips, so that adjacent pairs of coarse strips have a coarse void therebetween,
    (ii) a plurality of fine patterns, each fine pattern defined by an array of fine conductive strips in combination with fine conductive borders and disposed in one of the coarse voids and;
    (iii) an array of fine voids in each of said coarse conductive strips where each of said fine voids is rectangular and said array of fine voids is disposed transverse to said primary direction of travel,
said linear induction drive element arrays on said powered vehicle said lower surface being further characterized in that a) at least one array of coarse linear induction drive elements is parallel to said array of coarse conductive strips and induces first currents in first conductive loops defined by said coarse conductive strips and first borders at edges of said coarse conductive strips, said first currents in said coarse conductive strips imparting forward or reverse forces on said coarse linear induction drive elements, said forward or reverse forces having vector amplitude with horizontal and vertical components and b) at least one array of fine linear induction drive elements is parallel to said array of fine voids and induces second currents in second current loop pathways defined by fine conductive strips and second borders surrounding each of said fine void array elements, said second currents in said fine conductive strips imparting lateral forces on said fine linear induction drive elements, said lateral forces having vector amplitude with horizontal and vertical components.

2. Said roadway of claim 1, further comprising a layer of high magnetic permeability material separated from said conductive surface by a thin non-conductive surface disposed under and parallel to said conductive surface, said high magnetic permeability material completing a magnetic circuit around said coarse conductive strips, said high magnetic permeability material being composed of high magnetic permeability sheets laminated together with alternating sheets of non-conducting material, the plane of each said high magnetic permeability sheet being both parallel to said primary direction of travel and perpendicular to said conductive surface, thereby favoring completion of said magnetic circuits around said coarse conductive strips to enhance said powered vehicle forward drive function while not favoring but still somewhat increasing magnetic permeability in magnetic circuits around said fine conductive strips.

3. Said roadway of claim 1, further comprising at least one of the following elements:
  a) a plurality of modular tiles within which said conductive surface comprises a nested pattern of said regularly spaced non-conductive voids defining said first and second current loop pathways in portions of said conductive surface surrounding said voids, said modular tiles extending in a substantially horizontal plane both laterally and in said primary direction of travel to create at least one traffic lane wherein said powered vehicle is able to produce drive forces in the manner described in claim 1 regardless of the presence of tile boundaries under said powered vehicle;
  b) said traffic lane disposed at a boundary between said roadway and ordinary streets, designated on-ramp, whereon said powered vehicle may retract wheels used on ordinary streets and thereby lower said linear induction drive element arrays on said lower surface into close proximity to said conductive surface and said traffic lane disposed at a boundary between said roadway and ordinary streets, designated off-ramp, whereon said powered vehicle may deploy wheels to be used on ordinary streets while raising said linear induction drive element arrays on said lower surface away from close proximity to said ordinary streets;
  c) said traffic lane extended along said primary direction of travel to length, 2s, and said powered vehicle subject to acceleration, a, caused by forward force according to the invention whereon said powered vehicle achieves a maximum velocity, v, predicted by the formula: $v=a^{3/2}s^{1/2}$; said roadway having at least one said traffic lane extended along the primary direction of travel, said traffic lane extended along primary direction of travel to length, 2s, designated high speed roadway;
  d) said high speed roadway gradually curving to change said powered vehicle compass orientation as said powered vehicle proceeds along said primary direction of travel;
  e) said traffic lane disposed between said high speed roadway and at least one said on-ramp or at least one said off-ramp and having laterally adjacent tiles with said high speed roadway and said on-ramp or said off-ramp whereon said powered vehicles move from said on-ramp to said high speed roadway or whereon said powered vehicles move from said high speed roadway to said off-ramp, said traffic lane disposed between high speed roadway and at least one said on-ramp or at least one said off-ramp being designated local line roadway;
  f) said local line roadway curving to change compass orientation of forward moving said powered vehicle;
  g) a control system comprising first computer located on said powered vehicle receiving supervisory guidance from a second computer and associated personnel located in transit authority facilities, said first computer directing discrete commands to affect said powered vehicle motions;
  h) a plurality of said traffic lanes, designated mixing bowl, having access along said primary direction of travel for a plurality of discrete incoming said traffic lanes, said mixing bowl providing a plurality of congestion reducing additional said traffic lanes for each said incoming said traffic lane, said mixing bowl having access along said primary direction of travel to a plurality of discrete outgoing said traffic lanes; each of said plurality of congestion reducing additional said traffic lanes disposed adjacent to one or two nearest neighbor said congestion reducing additional said traffic lanes, said adjacent disposal forming in aggregate a continuous lateral and forward grid of said modular tiles over the entire extent of said mixing bowl; a plurality of said powered vehicles maneuvering in concert within said mixing bowl to a) form lines associated with said outgoing traffic lanes, b) shift said lines associated with said outgoing traffic lanes to face said outgoing traffic lanes along said primary direction of travel, c) converge into fewer said traffic lanes connecting to said outgoing traffic lanes and enter said outgoing traffic lanes; whereby said powered vehicles entering said mixing bowl from said plurality of discrete incoming traffic lanes proceed without collision or stopping to a plurality of discrete outgoing said traffic lanes from said mixing bowl;
i) said traffic lane disposed between a first said traffic lane and at least a second said traffic lane, designated connecting lane, said connecting lane having adjacent tiles with both first said traffic lane and at least second said traffic lane;
j) traffic infrastructure comprising several said roadways, several said connecting lanes, said control system and a plurality of said powered vehicles proceeding in concert from diverse starting points to diverse destinations;
k) parking facilities comprising said traffic infrastructure, said diverse destinations including at least one of the following elements: i) said powered vehicle passenger disembarkation station, ii) said powered vehicle passenger loading station, iii) said connecting lane to said roadway further along a said primary direction of travel, iv) ordinary city street, v) said traffic lane curving to change forward moving said powered vehicle compass orientation;
l) said traffic infrastructure further comprising a rectangular lattice of said connecting lanes;
m) passenger conveyance disposed between said parking facilities and nearby final destinations.

4. Said traffic infrastructure of claim 3, designated long distance infrastructure, further characterized in that said powered vehicle, designated high speed train, further comprises extended dimension in said primary direction of travel creating expanded passenger and freight capacity, said traffic lane further comprising an enclosure surrounding said high speed train within which reduced air pressure is maintained.

5. A dual mode vehicle comprising:
a) linear induction drive element arrays on a lower surface of a lower structural member of said dual mode vehicle that is substantially parallel to and in close proximity to said roadway conductive surface, said linear induction drive element arrays on said dual mode vehicle lower surface being further characterized in that i) at least one array of coarse linear induction drive elements is parallel to said array of coarse conductive strips and induces first currents in first conductive loops defined by said coarse conductive strips and first borders at edges of said coarse conductive strips, said first currents in said coarse conductive strips imparting forward or reverse forces on said coarse linear induction drive elements, said forward or reverse forces having vector amplitude with horizontal and vertical components and ii) at least one array of fine linear induction drive elements is parallel to said array of fine voids and induces second currents in second current loop pathways defined by fine conductive strips and second borders surrounding each of said fine void array elements, said second currents in said fine conductive strips imparting lateral forces on said fine linear induction drive elements, said lateral forces having vector amplitude with horizontal and vertical components,
b) retractable wheels that hold said linear induction drive element arrays above ordinary streets and bring said linear induction drive element arrays into close proximity with said roadway conductive surface when said dual mode vehicle passes onto said roadway.

6. Said dual mode vehicle of claim 5, further comprising elements selected from among the group of:
a) three axis wheel mount subassembly wherein a first axis defined by first rotary motor fastened to said dual mode vehicle lower surface turns a said dual mode vehicle wheel about a substantially vertical axis with center of rotation closer than said dual mode vehicle wheel diameter to said dual mode vehicle wheel ground footprint, a second axis defined by second rotary motor fastened to said first rotary motor moving portion elevates a strut holding a third rotary motor defining a third axis, said third axis being centered on said dual mode vehicle wheel turning about a substantially horizontal axis in response to torque produced by said third motor;
b) rechargeable electric energy storage;
c) interface to said control system associated with said traffic infrastructure;
d) communications and display equipment whereby passengers engage in business and recreational activities while said dual mode vehicle travels on said roadway via actions of said control system and without occupant driver attention;
e) allocation of said dual mode vehicle lower surface spaces to place wheel wells near said dual mode vehicle corners and disperse a plurality of said coarse drive element arrays and a plurality of said fine drive element arrays to discrete separated locations; f cooperation among at least three of said linear induction drive element arrays on said dual mode vehicle lower surface, each independently producing translational and levitation forces on said dual mode vehicle, thereby controlling said dual mode vehicle angular orientation in roll, elevation and azimuth;
g) low friction under surface of said dual mode vehicle cooperating with low friction of said roadway surface to minimize energy loss in the event of said dual mode vehicle contact with said roadway;
h) latches on said dual mode vehicle sides, rear and front that connect adjacent said dual mode vehicles to facilitate close convoy or emergency towing;
i) permanent magnets disposed on vehicle underside producing a levitation force against roadway that works in cooperation with said linear induction drive element arrays and
j) passenger modules that i) detach from said dual mode vehicles and attach to other conveyances ii) tilt passengers back to reduce deceleration discomfort and iii) provide a versatile communications interface platform.

7. Said dual mode vehicle of claim 6, further comprising at least three of said three axis wheel mount subassemblies working in concert to electronically brake, forward drive, reverse, turn, oblique drive and lateral drive said dual mode vehicle, further comprising said at least three of said three axis wheel mount subassemblies working in concert to maintain stable level orientation of said dual mode vehicle and to mitigate transmission of shocks from ordinary surface roads to said dual mode vehicle said lower structural member.

8. Said dual mode vehicle of claim 5, wherein an object is disposed above and supported by said lower structural member, designated object carrying vehicle, and further comprising elements selected from the group of:
a) said object being a conventional vehicle and said object carrying vehicle securing said conventional vehicle and moving it to a remote location;
b) said object being said conventional vehicle and, upon disembarkation of passengers from said conventional vehicle, said object carrying vehicle moving a plurality of said conventional vehicles to parking spaces using forward, reverse and lateral motion and tightly packing said conventional vehicles, wherein no structural modifications are required in a parking facility lacking roadway elements;
c) said object carrying vehicle carrying said object under automatic control via forward, reverse and lateral motion in a facility equipped with said roadways according to the invention using said linear drive element arrays on said object carrying vehicle;

d) said object being an aircraft, said aircraft further comprising extended dimension in said primary direction of travel creating expanded passenger and freight capacity, aircraft launch infrastructure comprising extended said roadway in a launch direction, an enclosure surrounding said aircraft and said object carrying vehicle, reduced air pressure being maintained within said enclosure and said enclosure having diaphragms for passing said aircraft into and out of said enclosure with minimum incursion of surrounding air into said enclosure, passengers entering said aircraft prior to aircraft passage through said diaphragm, said object carrying vehicle accelerating to aircraft flight speed and releasing said aircraft, whereupon said aircraft continues to a final destination under jet engine power and said object carrying vehicle decelerates to a stop;

e) said object being a spacecraft, said spacecraft further comprising extended dimension in said primary direction of travel creating expanded passenger and freight capacity, spacecraft launch infrastructure comprising extended said roadway in a launch direction, an enclosure surrounding said spacecraft and said object carrying vehicle, reduced air pressure being maintained within said enclosure, said enclosure having diaphragms for passing said spacecraft into said enclosure with minimum incursion of surrounding air into said enclosure, said enclosure having means such as polymer sheet punctured by exiting spacecraft for minimizing air incursion into enclosure prior to spacecraft exit, passengers entering said spacecraft prior to said spacecraft passage through said diaphragm, said object carrying vehicle accelerating to spacecraft first stage flight speed and releasing said spacecraft, whereupon said spacecraft exits said enclosure and accelerates to orbital velocity under rocket engine power and said object carrying vehicle decelerates to a stop.

9. A method for designing a municipal area transportation infrastructure according to the invention wherein said municipal area transportation infrastructure is modeled in software residing in a computer, the computer model of said municipal area transportation infrastructure being designated model infrastructure and computer models of vehicles operating in cooperation with said municipal area transportation infrastructure being designated vehicle representations, comprising steps selected from the group consisting of:

a) devising traffic rules that sustain aggregate traffic flow at near constant levels along the entire length of typical trips within a given model infrastructure; b) performing modeling and simulation runs that permit prediction of any need for traffic re-routing in all reasonably anticipated traffic conditions, along with sensitivity of total travel time to changes in said model infrastructure design parameters such as roadway segment lengths, lane counts and velocity profiles;

c) defining a model infrastructure figure of merit that embodies said municipal area transportation infrastructure cost and travel time;

d) writing a set of linear equations relating travel time to said model infrastructure design parameters;

e) using continuous optimization to minimize said model infrastructure figure of merit, whereby all said design parameters used in said linear equations are calculated;

f) running simulations to determine a model infrastructure mean time between failure, said failure being defined as a single root cause event where one or more vehicle representations experiences more than double the trip time that was projected on entry into said model infrastructure;

g) continuing iteration with said design parameters adjusted until said mean time between failure greater than one thousand hours is achieved for a defined set of said design parameters in said model infrastructure.

10. The method of claim 9, further comprising steps selected from the group consisting of:

a) providing a design for transitional roadways at the outskirts of municipal area transportation infrastructure, identified as said mixing bowls, that incorporate; i) means of sorting entering traffic into said powered vehicle lines ready to enter ongoing or terminal said traffic lanes with diverse destinations, ii) sufficient said traffic lanes to maintain the system wide aggregate said powered vehicle flow rate while reducing speed at entry with a safety factor that accommodates variable fractions of vehicles heading for a given exit and iii) planning for approximately 20 meters/second forward and 5 meters/second lateral target speeds in central mixing area;

b) providing a design for high strength-to-weight structures that suspend new infrastructure construction in the air above existing infrastructure, wherein; i) a lattice of said roadways and parking structures permeates the sky above existing buildings and ii) bridging structures associated with said lattice of said roadways and parking structures use columns placed near foundations of existing buildings such as exoskeletons, new free standing construction with minimum footprint, lateral support derived from crossing lattice elements at said roadway elevation and anchors at said lattice edges;

c) providing a design for a network of roadways permeating urban neighborhoods wherein; i) first entry into said network embodies immediate left and right high velocity exit lanes into high capacity parking facilities having traffic buffer zones; ii) connections forward embody interconnected said local line roadways that support massive parallel flow across a broad front into city interiors and sufficient parking capacity to accommodate anticipated traffic near passengers' ultimate destinations; iii) parking facilities bridge adjacent said local line roadways, provide automatic parking, forward said powered vehicles to passenger selected departure points and move people to their final destinations and iv) said control system automatically parks said powered vehicles after passengers disembark at ordinary street level;

d) providing a design for said roadway intersection arrangements wherein; i) traffic on said high speed roadways passes through said intersection without slowing; ii) at least one of said roadways entering said intersection via any of several entry said roadway portals is able to pass on through each said roadway exit portal continuing onward from said intersection; iii) all said roadways passing through said intersection are associated with adjacent said roadways carrying traffic in opposite directions; iv) local access to and from high speed roadway lines exists; v) traffic entering any said high speed roadway runs parallel while accelerating to match velocity, then merges and vi) traffic exiting any said high speed roadway splits off to parallel lanes then decelerates to join local and intersecting traffic;

e) providing a design for vertical said roadway support by catenary tensile suspension elements and vertical tensile elements suspended from the said catenary tensile suspension elements;

f) providing traffic rules for each of several roadway infrastructure elements selected from the group consisting of i) reduce speed upon entering said roadway element; ii) fan out into multiple said traffic lanes per starting said traffic lane upon entering said roadway element; iii) form rows after entering said roadway element; iv) shift rows laterally and place said powered vehicles in said traffic lanes lined up with exit said traffic lanes then accelerate toward said exit said traffic lanes to reach a target velocity associated with a subsequent said roadway element; v) shift into a slower moving said traffic lane as required in order to avoid forcing following said powered vehicles to reduce speed; vi) pass forward to a continuing said roadway in order to avoid creating congestion among following said powered vehicles; vii) match said powered vehicle velocity with moving said powered vehicles on a disembarkation ramp and disembark said powered vehicle passengers and viii) match velocity in said powered vehicle said traffic lane to velocity of an adjacent conveyor, then transfer objects to or from said conveyor;

g) taking into account; i) reduction in the force of gravity by a centrifugal force associated with said high speed train velocity and said roadway radius of curvature as said roadway curves around an Earth axis to reduce required roadway strength supporting said high speed train and ii) the ability of roadways to exert lateral force on said high speed train whereby a lateral centripetal force component on said high speed train may be countered;

h) providing a design for very gradual curves on said high speed roadways to avoid excessive centrifugal forces and to reduce vibration;

i) providing a design for raising said roadways high enough that local terrain imposes no constraints on said roadway placement;

whereby a transportation infrastructure meeting the needs of our society may be designed and fabricated in the United States and elsewhere.

* * * * *